US011134146B2

(12) United States Patent
Iyer et al.

(10) Patent No.: US 11,134,146 B2
(45) Date of Patent: Sep. 28, 2021

(54) USER PREFERENCE UTILIZATION IN REMOTE APPLICATIONS

(71) Applicant: Carrier Corporation, Palm Beach Gardens, FL (US)

(72) Inventors: Siva S. Iyer, Carmel, IN (US); Adam Kuenzi, Silverton, OR (US); Daniel J. Dempsey, Carmel, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/638,204

(22) PCT Filed: Aug. 8, 2018

(86) PCT No.: PCT/US2018/045700
§ 371 (c)(1),
(2) Date: Feb. 11, 2020

(87) PCT Pub. No.: WO2019/036241
PCT Pub. Date: Feb. 21, 2019

(65) Prior Publication Data
US 2020/0252498 A1 Aug. 6, 2020

Related U.S. Application Data

(60) Provisional application No. 62/544,999, filed on Aug. 14, 2017.

(51) Int. Cl.
*H04W 8/18* (2009.01)
*H04M 1/72415* (2021.01)
(Continued)

(52) U.S. Cl.
CPC .... *H04M 1/72415* (2021.01); *G07C 9/00309* (2013.01); *H04L 67/125* (2013.01); *H04W 4/029* (2018.02); *H04W 8/18* (2013.01)

(58) Field of Classification Search
CPC ........ H04W 8/18; H04W 4/029; H04L 67/125
See application file for complete search history.

(56) References Cited

U.S. PATENT DOCUMENTS 5,850,753 A 12/1998 Varma
7,908,211 B1 * 3/2011 Chen ...................... H04W 4/02
705/39

(Continued)

OTHER PUBLICATIONS

International Search Report and Written Opinion for application PCT/US2018/045700, dated Jan. 28, 2019, 19 pages.

(Continued)

*Primary Examiner* — Barry W Taylor
(74) *Attorney, Agent, or Firm* — Cantor Colburn LLP

(57) ABSTRACT

A method of applying a user preference from a user device in a first space to a user controllable device in a second space. The method includes acquiring a user preference associated with a first building system, authorizing communication with at least one user controllable device associated with a second building system, permitting control of a selected controllable device associated with the second building system based on the authorizing, and applying the user preferences associated with the first building system to the selected controllable device associated with the second building system.

17 Claims, 10 Drawing Sheets

(51) Int. Cl.
*H04W 4/029* (2018.01)
*G07C 9/00* (2020.01)
*H04L 29/08* (2006.01)

(56) References Cited

U.S. PATENT DOCUMENTS

| | | | |
|---|---|---|---|
| 9,437,063 B2 | 9/2016 | Schoenfelder et al. | |
| 9,485,344 B2 | 11/2016 | Mahasenan et al. | |
| 9,489,062 B2 | 11/2016 | Corcoran et al. | |
| 9,602,172 B2 | 3/2017 | Jackson et al. | |
| 9,652,917 B2 | 5/2017 | Johnson et al. | |
| 2005/0051620 A1* | 3/2005 | DiLuoffo | G07F 7/08 235/382 |
| 2007/0176739 A1 | 8/2007 | Raheman | |
| 2008/0155429 A1 | 6/2008 | Frank et al. | |
| 2013/0215058 A1 | 8/2013 | Brazell et al. | |
| 2015/0006686 A1 | 1/2015 | McMillan | |
| 2015/0125832 A1* | 5/2015 | Tran | G09B 19/0092 434/127 |
| 2015/0170448 A1 | 6/2015 | Robfogel et al. | |
| 2015/0326701 A1 | 11/2015 | Robfogel et al. | |
| 2016/0142868 A1* | 5/2016 | Kulkarni | H04W 4/80 455/456.5 |
| 2016/0150350 A1* | 5/2016 | Ingale | H04W 12/08 370/255 |
| 2016/0182703 A1 | 6/2016 | Khurana et al. | |
| 2016/0234186 A1 | 8/2016 | Leblond et al. | |
| 2016/0260271 A1* | 9/2016 | Belhadia | G06F 21/35 |
| 2016/0261425 A1* | 9/2016 | Horton | G05D 23/1917 |
| 2017/0053467 A1* | 2/2017 | Meganck | G07C 9/00563 |
| 2017/0115018 A1* | 4/2017 | Mintz | G06N 5/022 |
| 2017/0122617 A1 | 5/2017 | Sinha et al. | |
| 2017/0147016 A1 | 5/2017 | Lingineni | |
| 2018/0007099 A1* | 1/2018 | Ein-Gil | G06F 9/468 |
| 2019/0089808 A1* | 3/2019 | Santhosh | H04L 67/32 |

OTHER PUBLICATIONS

Invitation to Pay Additional Search Fees for application PCT/US2018/045700, dated Nov. 26, 2018, 54 pages.

* cited by examiner

USER PREFERENCE UTILIZATION IN REMOTE APPLICATIONS

FIELD OF INVENTION

Embodiments relate generally to credential authentication with a user device and applications of user preferences to a remote location and application. More particularly, to identification and authentication of a user credential and using the information to obtain a user preference for a building system such as an HVAC system, security system, elevator system or access control system.

DESCRIPTION OF RELATED ART

Modern structures, such as office buildings and residences, utilize heating, ventilation, and cooling (HVAC) systems having controllers that allow users to control the environmental conditions within these structures. These controllers have evolved over time from simple temperature based controllers to more advanced programmable controllers, which allow users to program a schedule of temperature set points in one or more environmental control zones for a fixed number of time periods as well as to control the humidity in the control zones, or other similar conditions. Such structures may also have access control and security systems that employ a credential such a card, ID badge, or mobile device running an application to permit a user to access or control various areas in the structure. Moreover, in some instances such as in the hospitality industry a user may employ an app on a mobile device that facilitates access to a space, elevator or a room. Users may also employ an app that facilitates access to other facilities, including their home. Some of these apps may include a security system or a home HVAC systems. Users commonly can configure their home systems with a variety of preferences and selections. However, when traveling, a user would commonly be required to reprogram preferences and selections for each individual system encountered. Excessive programming is burdensome on the user and may result in disinterest or users not taking advantages of the features and benefits a building system may provide. Therefore, having a building system that can utilize and take advantage of a user's preprogrammed preferences for application in a remote application is highly desirable and would provide improved functionality.

BRIEF SUMMARY

Described herein in an embodiment is a method for applying a user preference from a user device in a first space to a user controllable device in a second space. The method includes acquiring a user preference associated with a first building system, authorizing communication with at least one user controllable device associated with a second building system, permitting control of a selected controllable device associated with the second building system based on the authorizing, and applying the user preferences associated with the first building system to the selected controllable device associated with the second building system.

In addition to one or more of the features described above, or as an alternative, further embodiments may include that the acquiring includes communicating to at least one of a cloud computing environment, the user device, and a control device associated with the first building system.

In addition to one or more of the features described above, or as an alternative, further embodiments may include that the user preferences include at least one of a user setting, a schedule, and building system operational parameters.

In addition to one or more of the features described above, or as an alternative, further embodiments may include that the authorizing includes transmitting a request to the second building system, the request including presenting a credential for authentication.

In addition to one or more of the features described above, or as an alternative, further embodiments may include that the credential includes at least one of an identification of the user, an identification of a user device, an identification of the control device associated with the first building system, a biometric, and a password.

In addition to one or more of the features described above, or as an alternative, further embodiments may include that the request is at least one of a request for access to a space in the second building system and a request for authentication for communication to the second building system.

In addition to one or more of the features described above, or as an alternative, further embodiments may include that the request further includes the user preference information.

In addition to one or more of the features described above, or as an alternative, further embodiments may include that the authorizing further includes at least one of a cloud computing environment and a control device associated with the second building system authenticating the credential and communicating an indicia of authentication to the first building system.

In addition to one or more of the features described above, or as an alternative, further embodiments may include that the indicia of authentication is at least one of a message, a token, a digital certificate, and a password.

In addition to one or more of the features described above, or as an alternative, further embodiments may include that the authenticating includes validating a biometric.

In addition to one or more of the features described above, or as an alternative, further embodiments may include that the cloud computing environment and controller associated with the second building system includes a local server.

In addition to one or more of the features described above, or as an alternative, further embodiments may include that the authorizing includes the user device communication to at least one of a cloud computing environment and a control device associated with the second building system.

In addition to one or more of the features described above, or as an alternative, further embodiments may include that the second building system is an access control system and the control device is a lock.

In addition to one or more of the features described above, or as an alternative, further embodiments may include that the permitting control of a selected controllable device associated with the second building system includes communicating information associated with the authentication to the selected controllable device of the second building system.

In addition to one or more of the features described above, or as an alternative, further embodiments may include that the communicating information associated with the authentication includes at least one of a cloud computing environment and a control device associated with the second building system connecting to and communicating to the selected controllable device.

In addition to one or more of the features described above, or as an alternative, further embodiments may include that the information associated with the authentication includes permissions associated with the permitting, the permissions including at least one of a duration associated with the permitting control, limitations on controllable features of the control of the selected controllable device, and operational parameters of the second building system to be controlled.

In addition to one or more of the features described above, or as an alternative, further embodiments may include that the permitting control of a selected controllable device associated with the second building system includes communicating information associated with the authentication to the first building system.

In addition to one or more of the features described above, or as an alternative, further embodiments may include that the communicating information associated with the authentication includes at least one of a cloud computing environment and a control device associated with the second building system connecting to and communicating to at least one of the user device, and a cloud computing environment associated with the first building system.

In addition to one or more of the features described above, or as an alternative, further embodiments may include that the information associated with the authentication includes permissions associated with the permitting control, the permissions including at least one of a duration associated with the permitting control, limitations on controllable features of the control of the selected controllable device, operational parameters of the second building system to be controlled.

In addition to one or more of the features described above, or as an alternative, further embodiments may include that the applying the user preferences associated with the first building system to the selected controllable device associated with the second building system includes communicating the user preferences to the selected controllable device, the selected controllable device implementing the user preferences based on permissions established as part of the permitting.

In addition to one or more of the features described above, or as an alternative, further embodiments may include that the applying includes at least one of a cloud computing environment associated with the second building system, a control device associated with the second building system, a cloud computing environment associated with the first building system, a control device associated with the first building system, and the user device communicating the user preferences to the selected controllable device.

In addition to one or more of the features described above, or as an alternative, further embodiments may include that the building system is at least one of a heating ventilation, or air conditioning system (HVAC), a security system, access control system, and a vehicle.

In addition to one or more of the features described above, or as an alternative, further embodiments may include that the first building system is an HVAC system and the user preferences are temperature settings, humidity settings, schedules and HVAC system operational parameters.

Also described herein in and embodiment is a system for applying a user preference associated with a first building system in a first building space to a user controllable device in a second building system in a second building space. The system includes a user device in operable communication with a first building system and a second building system, the first building system including a user preference associated with the operation thereof, at least one of the first building system and the user device executing a method to transmit a request for access to the second building system requesting access to the second building space, wherein the at least one of the first building system and the user device receives an authorization for communication with at least one selectable controllable device associated with a second building system from the second building system and the second building system permits control of the selected controllable device associated with the second building system, and wherein the user preferences associated with the first building system are communicated to and applied by the selected controllable device associated with the second building system.

Also described herein in an embodiment is a system for applying a user preference associated with a first building system in a first building space to a user controllable device in a second building system in a second building space. The system includes means for acquiring a user preference associated with a first building system, means for authorizing communication with at least one user controllable device associated with a second building system, means for permitting control of a selected controllable device associated with the second building system based on the authorizing, and means for applying the user preferences associated with the first building system to the selected controllable device associated with the second building system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded of the described embodiments is particularly pointed out and distinctly claimed in the claims at the conclusion of the specification. The foregoing and other features, and advantages of the described embodiments are apparent from the following detailed description taken in conjunction with the accompanying drawings in which

DETAILED DESCRIPTION

Figure 1:
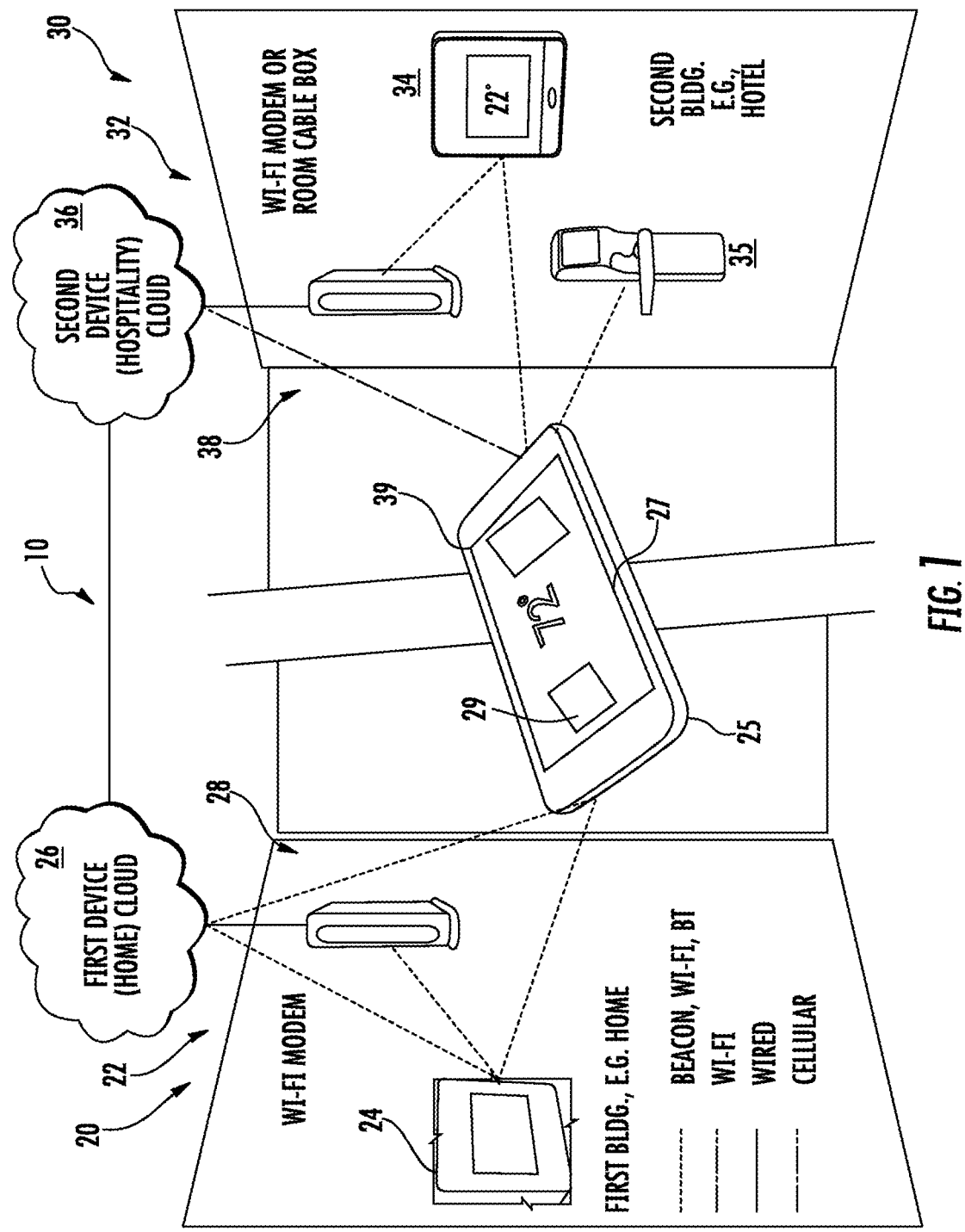
FIG. 1 depicts a simplified diagrammatic view of the system and interfaces for implementing the methodology of utilizing user preferences between two building systems in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments related to a method of applying a user preference from a user device in a first space to a user controllable device in a second space. The method includes acquiring a user preference associated with a control device in the first space. For example a user preference for a user's home thermostat acquired from any of the thermostat, a cloud application storing user preferences for that thermostat, or the user device. The method also includes authorizing the user device for communication with at least one user controllable device associated with the second space. For example, the user or user devices sends a request, where processing the request includes authenticating the user device to a server communicating with the user controllable devices in the second space. In response the user or user device may receive a credential. The credential provides the verification that the server has authorized communication with the user device, or on its behalf. The method also includes permitting control of a selected user controllable device associated with the second space based on the authorizing. That is, the credential or a token and an ID associated with the user or user device is employed to provide information, and trust communication with the user device. Finally, based on the request, one or more user preferences associated with the control device in the first space are applied to the user controllable device associated with the second space.

Referring now to the drawings, FIG. 1 illustrates a diagrammatic overview of a system 10 for using user preferences in a building system environment. In an embodiment the system 10 includes a building system 20 associated with a first building space 22. For example, a home or office. In application, this building space 22 would be one that the user employs commonly and would have established settings and preferences. For example the building space 22 may be a user's home having a security system or access control system or heating ventilation and air conditioning (HVAC) system. Each of these systems 20 may include a controller 24 that is employed to control the system 20 and interface to the building. In addition, some, or all of the functionality provided by to control the building system 20 may be based on methods and processes executed remotely such as on a local or remote server or cloud computing environment 26. As will be appreciated the first cloud computing environment 26 could include a local or remote server, or the system could be entirely remote. The building system 20 may also include a local and remote communication network and system 28 for facilitating communication and control of various features in the building system 20 as well as for facilitating communication between a user device, 25, controller 24, and the server or cloud computing environment 26. The building system 20 may also include an application (app) 29 that is operable on the user device 25, that permits and facilitates the user to enter and receive information and for user device 25 to communicate with and control the building system 20. In an embodiment, the app 29 may be employed by the user to set operating parameters, set points e.g., temperature settings schedules, and the like for the building system 20.

In an embodiment, the system 10 also includes a second building system, motor vehicle, recreational vehicle, and the like 30 associated with a second building or remote space 32. For example, an office or room in a hotel, recreational vehicle, car and the like. In application, this second building space 32 would be one that the user employs occasionally or perhaps even only once. It should also be appreciated that while the embodiments herein are described with respect to a second building system 30, that distinction is for illustration only, the second space 32 could be any space where application of the preferences from the first space may be advantageous. As can be appreciated, typically such a building space would be one that a particular user would not have established settings and preferences. For example, the second building space 32 may be an office space or hotel room having a security system or access control system and/or HVAC system. Each of these systems 30 may include a controller 34 that is employed to control the system 30 and interface to the building. In addition, once again, some, or all of the functionality provided by and control the building system 30 may be based on methods and processes executed remotely such as on a local or remote server or second cloud computing environment 36. As will be appreciated the second cloud computing environment 36 could include a local or remote server, or the system could be entirely remote. The building system 30 may also include a local and remote communication network and system 38 for facilitating communication and control of various features in the building system 30 as well as for facilitating communication between the user device 25, controller 34, and the server or second cloud computing environment 36. Likewise, the building system 30 may also include an application (app) 39 that is operable on the user device 25, that permits and facilitates the user to enter and receive information and for user device 25 to communicate with, interface with, and control selected aspects of building system 30. In an embodiment, the app 39 may be employed by the user for example to facilitate user authentication and access permissions for access to the second building space 32 (e.g. facility or room). In another embodiment the app 39 may be employed to set operating parameters, set points e.g., temperature settings, lock setting, schedules, and the like for one or more select building system(s) 30.

Cloud computing is a widely adopted and evolving concept. Generally, cloud computing refers to a model for enabling ubiquitous, convenient, and on-demand access via Internet to shared pools of configurable computing resources such as networks, servers, storages, applications, functionalities, and the like. There are a number of benefits associated with cloud computing for both the providers of the computing resources and their customers. For example, customers may develop and deploy various business applications on a cloud infrastructure supplied by a cloud provider without the cost and complexity to procure and manage the hardware and software necessary to execute the applications. The customers do not need to manage or control the underlying cloud infrastructure, e.g., including network, servers, operating systems, storage, etc., but still have control over the deployed applications. On the other hand, the provider's computing resources are available to provide multiple customers with different physical and virtual resources dynamically assigned and reassigned according to clients' load. Further, cloud resources and applications are accessible via the Internet.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
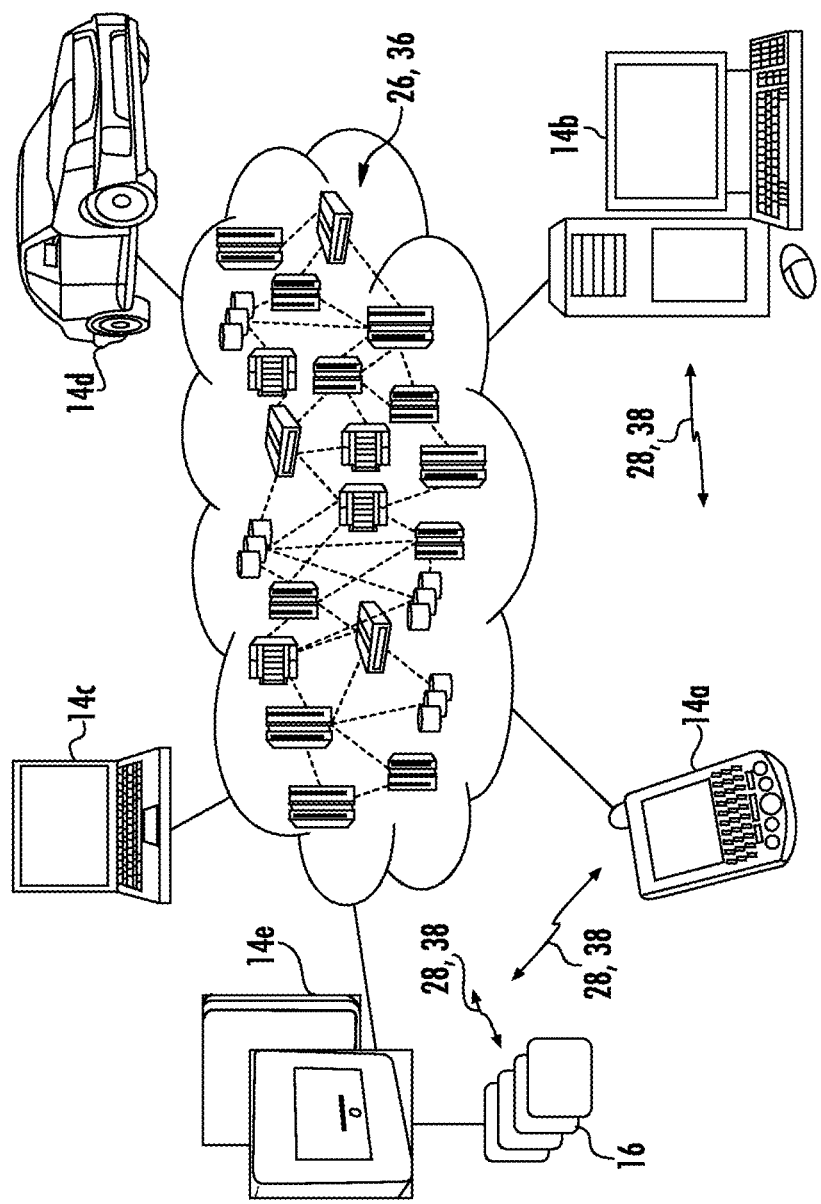
FIG. 2 is a depiction of a cloud computing environment as may be employed in accordance with an embodiment.

A cloud computing environment is service oriented with a focus on statelessness, low coupling, modularity, and semantic interoperability. At the heart of cloud computing is an infrastructure comprising a network of interconnected nodes. Referring now to FIG. 2, an illustrative cloud computing environment is depicted. As shown, cloud computing environment includes one or more cloud computing nodes, such as nodes 26 and 36 (FIG. 1), with which computing devices and controllers 14a-e may communicate. Cloud computing nodes 26, 36 may communicate with one another and/or be grouped (not shown) physically or virtually, in one or more networks, such as Private, Community, Public, or Hybrid clouds, or in one or more combinations thereof. This allows cloud computing environment to offer infrastructure, platforms and/or software as services for which a cloud consumer does not need to maintain or minimize resources at a local computing device level. It is understood that the types of computing devices 14 shown in FIG. 2 are intended to be illustrative only and that computing nodes such as 26, 36 and cloud computing environment can communicate with any type of computerized device over any type of network and/or network addressable connection (e.g., using a web browser).

The computing devices 14a-e such as user device 25 may be any form of a mobile device (e.g., smart phone, smart watch, wearable technology, laptop, tablet, etc.). The user device 25 can include several types of devices, in one instance, even a fixed device, e.g. a keypad/touch screen affixed to a wall in a building corridor/lobby, such as building system controllers 24, 34. In other words, the controllers 24, 34 and the user device 25 can all be computing devices 14a-e. It should be appreciated that the system controllers 24, 34 are typically part of the installed building system infrastructure, while the third user device 25 is typically owned and used by the user, service man, homeowner, and the like. The term "user device" 25 is used to denote all of these types of devices as may be employed by the user for the purposes of communication with the building system 20, 30. It should be appreciated that in some instances a user device 25 or the controller 24, 34 are proximate to the systems 20, 30, for example, a thermostat or system control unit, in others they are mobile for example, a car, PDA, or movable kiosk. For example, in an embodiment, the computing devices could be, a personal digital assistant (PDA) or cellular telephone tablet 14a, such as user device 25, desktop computer/terminal/server 14b, laptop computer 14c, a vehicle 14d, or a security or access control panel/HVAC thermostat 14e, such as controllers 24 and 34. Computing devices 14a-e may also be configured to communicate with each other or a variety of sensors 16. The communication with other computing devices 14a-e or sensors 16 could be wired or wireless as needed. The computing devices 14a-e are generally connected to and with a communication network, such as communication network 28, 38 such as local area network (LAN), wide area network (WAN) or cellular, and the like, to facilitate communication with and between computing devices or controllers 14a-e and the cloud computing nodes 26, 36 as will be described further below.

The computing devices, 14a-e such as user device 25, as well as other components of the system 20, 30 including building system controllers 24, 34 can communicate with one another, in accordance with the embodiments of the present disclosure, e.g., as shown in FIG. 1. For example, one or more user devices 25 and controllers 24, 34 may communicate with one another when proximate to one another (e.g., within a threshold distance). The user device 25 and controller 24, 34 may communicate over one or more networks 28, 38, (e.g., a communication bus) that may be wired or wireless. Wireless communication networks can include, but are not limited to, Wi-Fi, short-range radio (e.g., Bluetooth®), near-field infrared, cellular network, etc. In some embodiments, controllers 24, 34 may include, or be associated with (e.g., communicatively coupled to) one or more other networked building elements (not shown), such as computers, beacons, other system controllers, bridges, routers, network nodes, etc. The networked elements may also communicate directly or indirectly with the user devices 25 using one or more communication protocols or standards (e.g., through the network 28, 38). For example, the networked element may communicate with the user device 25 using near-field communications (NFC) and thus enable communication between the user device 25 and building system control unit 24, 34 or any other components in the system 10 when in close proximity to the user device 25 (NFC is a short range wireless protocol). Or, for example, the networked element may communicate with the user device 25 using Bluetooth and thus enable communication between the user device 25 and building system control unit 24, 34 or any other components in the system 10 from a further distance. The network 28, 38 may be any type of known communication network including, but not limited to, a wide area network (WAN), a local area network (LAN), a global network (e.g. Internet), a virtual private network (VPN), a cloud network, and an intranet. The network 28, 38 may be implemented using a wireless network or any kind of physical network implementation known in the art. The user devices 25 and/or the computing devices may be coupled to the controllers 24, 34, through multiple networks (e.g., cellular and Internet) so that not all user devices 25 and/or the computing devices are coupled to the any given controller 24, 34 or component through the same network 28, 38. One or more of the user devices 25 and the controller 24, 34 may be connected in a wireless fashion. In one non-limiting embodiment, the network 28, 38 is the Internet and one or more of the user devices 25 executes a user interface application (e.g. a web browser, mobile app) to contact and communicate with the system's controller 24, 34, through the network 28, 38.

Figure 3:
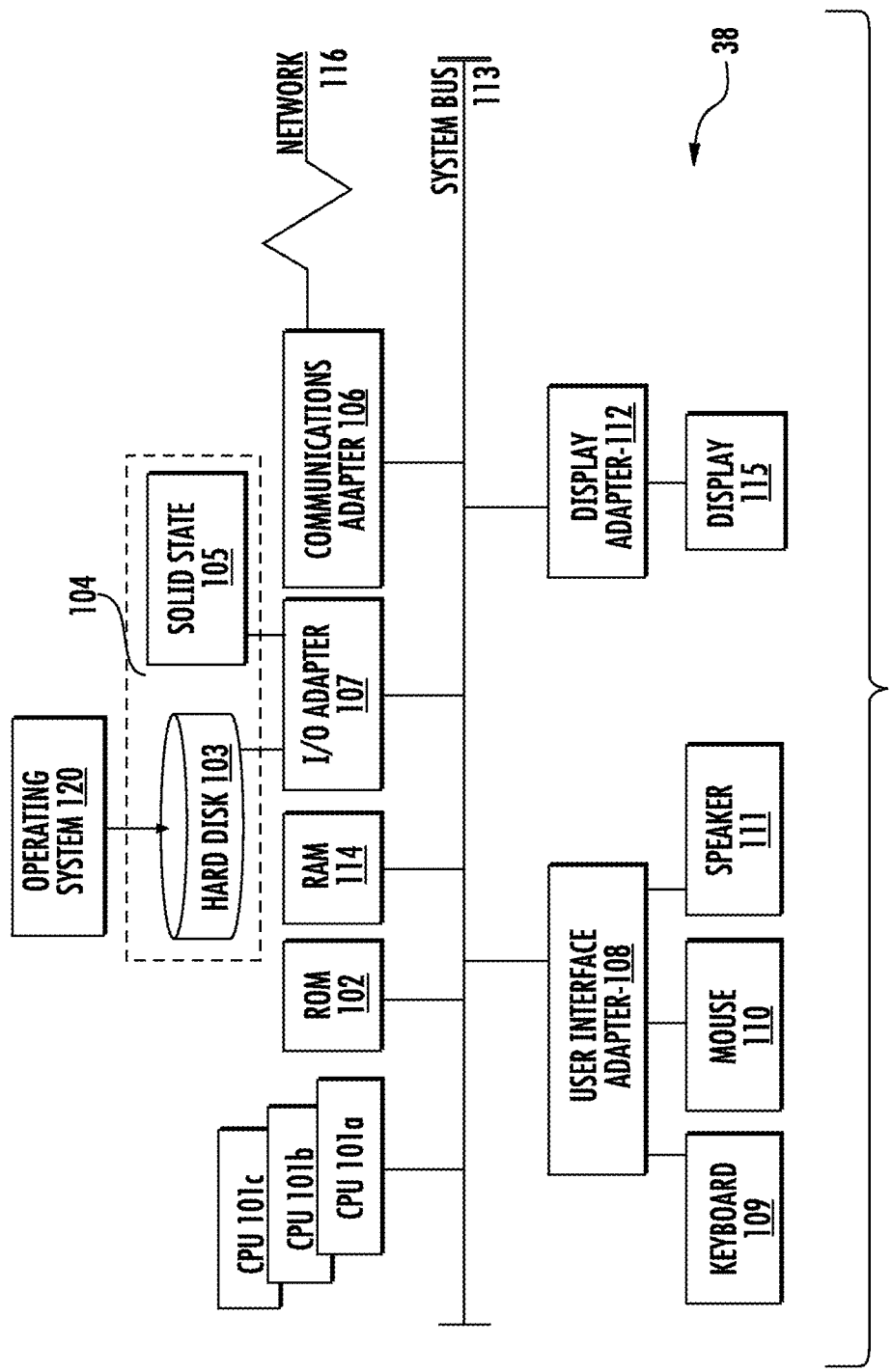
FIG. 3 depicts a simplified block diagram of a computing system as may be implemented in a user device in accordance with an embodiment.

Referring to FIG. 3, the computing devices 14a-e, including user device 25 and controllers 24, 34, may include a processing system including a processor, memory, and communication module(s), as needed to facilitate operation and interfacing with various components and elements of the building system(s) 20, 30. In one embodiment, the computing devices 14a-e, including user device 25 and controllers 24, 34, each may include a computing system 100 having a computer program stored on nonvolatile memory to execute instructions via a microprocessor related to aspects of communicating and controlling a building system(s) 20, 30 and in particular executing a method for utilizing user preferences from one building system 20 to another building system 30 as described further herein.

In an embodiment, the computing system 100 has one or more processing units (processors) 101a, 101b, 101c, etc. (collectively or generically referred to as processor(s) 101). The processor 101 can be any type or combination of computer processors, such as a microprocessor, microcontroller, digital signal processor, application specific integrated circuit, programmable logic device, and/or field programmable gate array. As is conventionally done, the processors 101 are coupled to system memory 114 and various other components via a system bus 113. The memory can be a non-transitory computer readable storage medium tangibly embodied in the user including executable instructions stored therein, for instance, as firmware. Read only memory (ROM) 102 is coupled to the system bus 113 and may include a basic operating system, which controls certain basic functions of system 100. Random Access Memory (RAM) 114 is also coupled to the system bus 113 and may include a basic storage space to facilitate program execution.

FIG. 3 further depicts an input/output (I/O) adapter 107 and a network adapter 106 coupled to the system bus 113. I/O adapter 107 communicates with hard disk 103 and/or solid state storage 105 or any other similar component. I/O adapter 107, hard disk 103, and solid state storage 105 are collectively referred to herein as mass storage 104. As is conventionally done an operating system 120 for execution on the processing system 100 may be stored in mass storage 104. A network adapter 106 interconnects bus 113 with an outside network 116 such as and including communications network 28, 38 and the like, enabling computing system 100 to communicate with other such systems. The network adapter 106 may implement one or more communication protocols as described in further detail herein, and may include features to enable wired or wireless communication with external and/or remote devices separate from the user device 25. The computing device 14a-e including the user device 25 and controllers 24, 34 may further include a user interface 27 (shown in FIG. 1, e.g., a display screen, a microphone, speakers, input elements such as a keyboard 109 or touch screen, etc. as shown in FIG. 3) as known in the art. A screen (e.g., a display monitor) 115 is connected to system bus 113 by display adaptor 112, which may include a graphics adapter and a video controller. A keyboard 109, mouse 110, and speaker 111 all interconnected to bus 113 via user interface adapter 108. It should be appreciated that in some embodiments some or all of these elements of the computing system 100 may be integrated. In one embodiment, adapters 107, 106, and 112 may be connected to one or more I/O busses that are connected to system bus 113 via an intermediate bus bridge (not shown). Suitable I/O buses for connecting peripheral devices may also be employed Additional input/output devices are shown as connected to system bus 113 via user interface adapter 108 and display adapter 112. It should be appreciate that the components of the system as described are for illustration purposes only. Features and functions as described may be omitted, integrated, or distributed as desired and as required to suit a particular application.

Embodiments provided herein are directed to apparatuses, systems, and methods for making and fulfilling requests for access to (e.g., with an authentication or a credential or a token) or information about a building space and applying a set of user preferences from another building space to that building space. In some embodiments, a request for access or information (herein after simply a request) may be communicated over one or more lines, connections, or networks, such as network 28, 38, e.g., a request made by a user device 25 and transmitted through the network 28, 38 to a cloud environment 26, 36 or controller 24, 34 and the like. The request may be initiated by a mobile device controlled by and/or associated with a user, e.g., user device 25 in a passive or active manner. In some embodiments, the mobile device may be operative in conjunction with a Transmission Control Protocol (TCP) and/or a User Datagram Protocol (UDP). In some embodiments, a request may be authenticated or validated based on a location and/or identification of the user device 25. For example if the user device 25 has been registered and preauthorized. Moreover, in some embodiments, a request may be fulfilled in accordance with one or more profiles, such as one or more user or mobile device profiles. In some embodiments the profiles may be registered as part of a registration process. In some embodiments, a building system may be registered with a service provider.

As noted, the controller 24, 34 may be associated with a building system (e.g., building systems 20, 30). The controller 24, 34 may be used to process or fulfill the requests that are submitted from one or more user devices 25. The requests may be received through the network 28, 38 from the one or more user devices 25 and/or the networked building elements such as other controllers or control devices e.g., 14a-e, which may be mobile devices, including, but not limited to phones, laptops, tablets, smartwatches, etc. As stated earlier, one or more of the user devices 25 may be associated with (e.g., owned by) a particular user.

For example, a user of a user device 25 may request service in an affirmative or active manner. The user may enter a request using an I/O interface of the user device 25, as described herein. That is, in some embodiments, an application, (app) 29, 39, or other program may be installed and operated on the user device 25 wherein the user may interact with the app or program to initiate or facilitate a request.

In other embodiments, or in combination therewith, the user may initiate a request in a passive manner. For example, a profile may be established for the user or the particular user device 25, optionally as part of a registration process with, e.g., a service provider and/or through historical data tracking. The profile may contain a log of the user's history and/or activities, such as where the user has gone or traveled to, the user's preferences, or any other data that may be applicable to the user. In some embodiments, the user profile and preferences may be accessed or analyzed to infer information regarding the user and/or the request. Resources may be provisioned or allocated to fulfill the request as needed.

The request for service may be conveyed or transmitted from the user device 25 through the network 28, 38. For example, the request may be transmitted to and/or over the Internet and/or a cellular network. The network(s) 28, 38 may include infrastructure that may be organized to facilitate cloud computing as described above. For example, one or more servers, such as a primary message server, a backup message server, and a device commissioning message server may be employed as part of the network 28, 38.

In some embodiments, the request may specify a type of service requested, at any level of detail or abstraction. For example, a first request may specify that access is requested, a second request may specify additional information requesting authentication, and a third request may specify additional parameters or constraints associated with the request. For example, in some embodiments, the request may include an identifier associated with the user or the particular user device 25 in order to allow a controller 24, 34 and or the cloud computing environment 26, 36 to distinguish between users and/or user devices 25.

In some embodiments the request may include a user biometric (voice, face, thumbprint) as an example credential presented with the request. In an embodiment the user biometric is retrieved by the user device 25 and is validated before sending the request and credential to the second building system 30. For example a picture for thumbprint verified for access to the user device 25. In another embodiment a user biometric is retrieved by the user device 25 and is sent along with the request and credential and is validated/authenticated by the second building system 30. For example, the biometric could be a picture that is sent with the request, the picture is then observed or compared to a picture on file for the part of the authentication. Finally, in another embodiment, the credential is sent along with the request to the second building system which then utilizes a biometric device (not shown) to read a biometric and validate that the requester is authentic.

Figure 4:
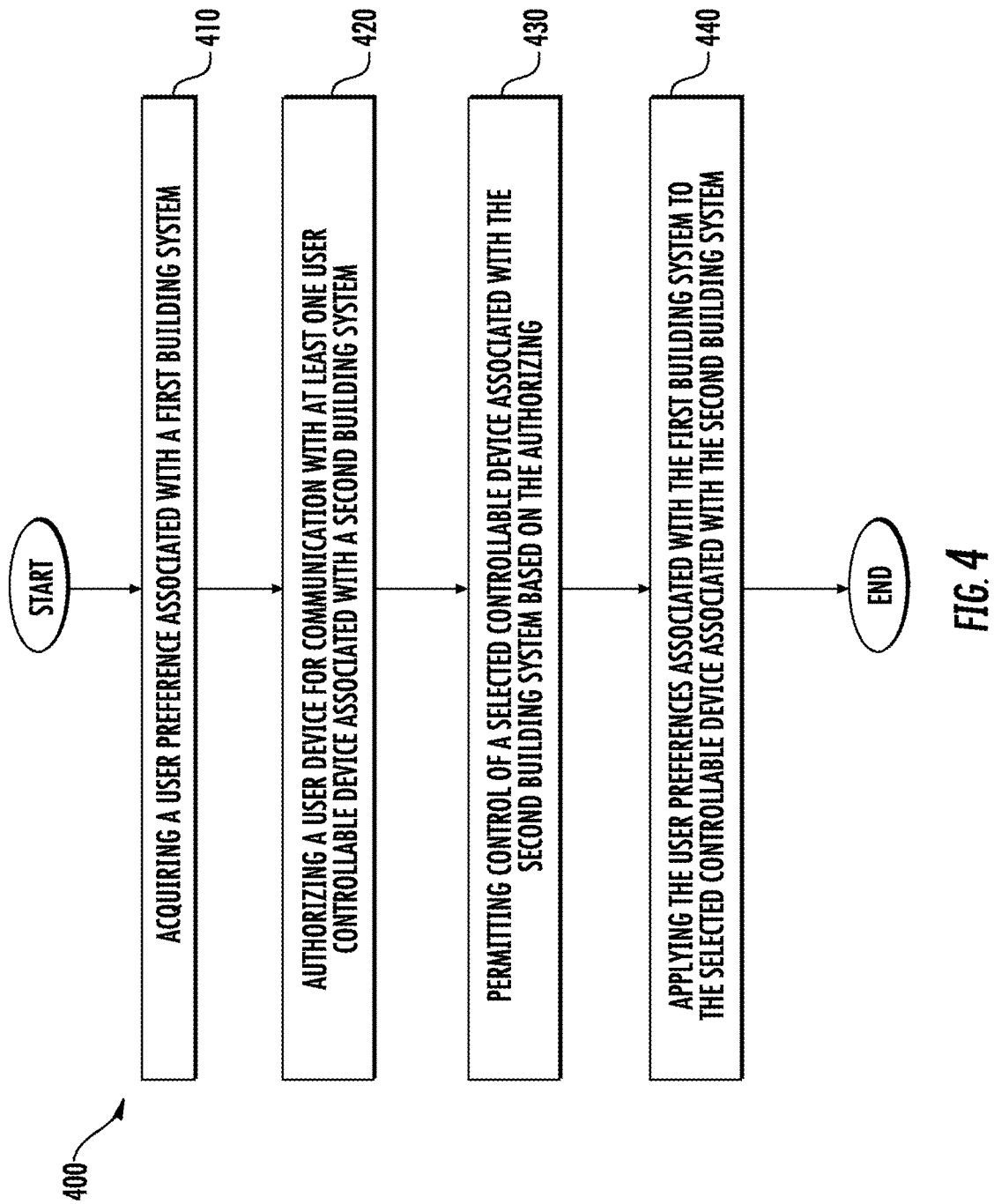
FIG. 4 depicts a flowchart of an example method utilizing user preferences in a remote building system in accordance with an embodiment.

Referring to FIG. 1, and turning now to FIG. 4 for a description of the methodology of applying a user preference from one building space to a second building space. FIG. 4 is a flowchart depicting an example high level method 400 for utilizing user preferences in a remote building system in accordance with an embodiment. In an embodiment, the method initializes with acquiring a user preference associated with a first building system 20 as depicted at process step 410. In the example described, the first building system 20 may be a user's home HVAC system, and the controller 24 for that building system may be the thermostat for that HVAC system. In an embodiment, the preferences acquired may include settings, set points schedules and the like, as have been established by the user. In an embodiment these preferences may be stored in the controller 24, cloud computing system 26 associated with the HVAC system or even in an app 29 associated with the HVAC and/or controller 24 operating on the user device 25. The user preferences may be acquired in a variety of ways depending on a given embodiment and/or application. For example in one embodiment, the app 29 on the user device 25 may query the controller 24 directly, in another embodiment the app 29 on the user device 25 may query the server or cloud environment associated with the first building system 20 and request or download the preferences. It should be appreciated that the preferences may be requested by the user device 25 or through the user device 25 with the request coming from another server or another app e.g., 39 associated with the second building system 30. Moreover, in another embodiment, the request could be initiated from one cloud computing environment 26 to another 36. In an embodiment, the preferences associated with building system 20 are requested and acquired by an app associated with that building system 20 and the under selected conditions, the preferences may be passed on the user device 25 to a second app 39 associated with building system 30. The preferences may then be provided by the app 39 associated with the second building system 30 under selected conditions. In another embodiment, the preferences could be passed from one cloud computing environment 26 to another 36.

Continuing with FIG. 4 and the method 400, at process step 420 the method 400 includes authorizing the user device 25 for communication with at least one user controllable device associated with the second building system 30. The user controllable device associated with a second building system 30 could include controller 34, or other such computing devices 14*a-e* as described earlier. Moreover, the authorization could include communication via another controller 34 or computing device 14*a-e*. In one embodiment the controllable device for the second building system 30 is controller 34 and the access is via a server or cloud computing network 36 as described earlier. In another embodiment the authorization may be through a computing device 14*a-e* such as a room lock 35. In some embodiments the authorization includes a request for access (whether physical or via communications) to the second building system 30 by presentation of a form of credential. For example, via the app on the user device 25 where the user device 25 is preregistered with the second building system 30. Such a request may be via an app on the user device 25, or the cloud computing environment 26 associated with the first building system. In some embodiments, the authorizing includes validating the request for access and providing access or an authorization for the communication. In another embodiment the authorizing includes a validation of the request for access and providing a token to facilitate further authenticated communications. In some embodiments the authorization and/or token is provided to the user device 25, in other embodiments the authorization/token is provided to a component of the first building system 20. In some embodiments, other techniques could be employed for authentication. For example, biometrics may be employed as a means of authenticating to the second building space 30. This could be done by a thumbprint reading on the sensor on the user device 25 relayed to the other cloud computing environment 36 (as depicted in step 920) or a sensor (not shown) receiving a biometric associated with a credential shared (as depicted in step 920, i.e., a biometric profile or reference to a profile). The biometric could be a thumbprint or a picture of a person taken by a camera (phone's camera or other) or a voice recognition, and the like.

Continuing with FIG. 4 and the method 400, the method 400 includes permitting control of a selected controllable device associated with the second building system 30 based on the authorizing as depicted at process step 430. In an embodiment permitting control may include communicating between components of the second building system 30 and components of the first building system 20 or the user device 25. In some embodiments the communication may be directly with the user device 25 and a controller 34 or component of the second building system 30, for example lock 35. In some embodiments, the permitting includes informing the controller of the second building system to accept communications from the user device 25 or a component of the first building system 20 such as the cloud computing environment 26 of the first building system 20. In some embodiments the permitting is based on the presentation of the token provided as part of the authorizing.

Continuing with FIG. 4 and the method 400, at process step 440 the method 400 includes applying the user preferences associated with the first building system 20 to the selected controllable device associated with the second building system. For example, in an embodiment, the preferences associated with an HVAC system may be applied to the second building system 30, and in particular to the controller 34 for the second building system 30. In an embodiment, the preferences may be communicated by user device 25 to user controllable device associated with the second building system 30. The user controllable device associated with a second building system 30 could include controller 34, or other such computing devices 14*a-e* as described earlier. In another embodiment, the preferences are transmitted directly from user device 25 to the controller 34 of the second building system 30. In yet another embodiment, the preferences are transmitted via a server or cloud computing environment 26 as described earlier to a component of the second building system 30. More particularly, the cloud computing environment 26 of the first building system 20 may employ a token provided during the authorizing to communicate with and provide the preferences to a computing device 14*a-e* or the controller 34 of the second building system 30.

Figure 5:
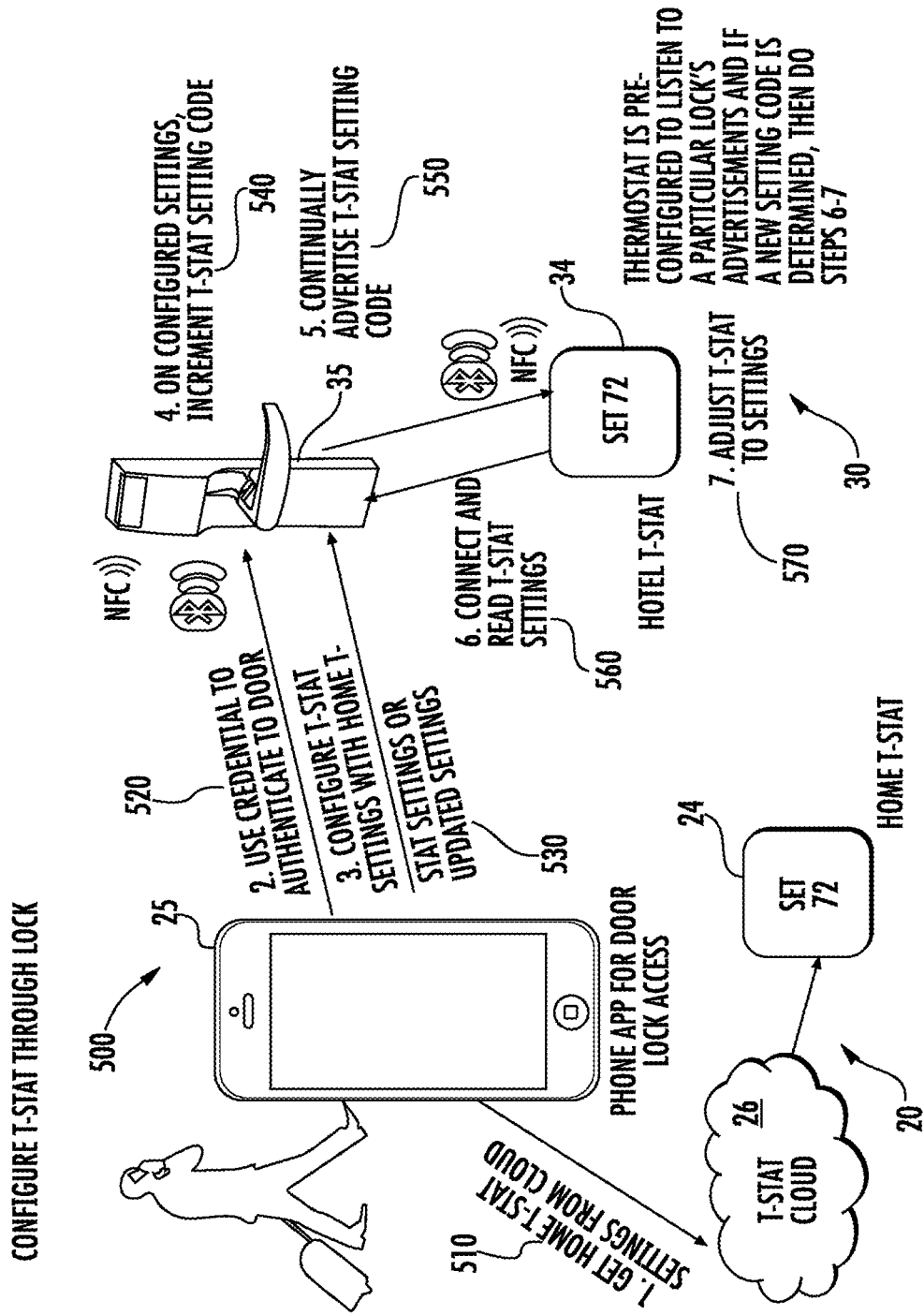
FIG. 5 depicts a simplified diagrammatic view of the system and interfaces for implementing the methodology of utilizing user preferences between two building systems in accordance with an embodiment.

Turning now to FIG. 5 as well for further example of an embodiment. FIG. 5 depicts a simplified diagrammatic view of an example system and interfaces for implementing the methodology 500 of utilizing user preferences between two building systems in accordance with an embodiment. In this embodiment, the controller 34 of the second building system 30, e.g., a thermostat in a hospitality application is configured via a lock 35 for access control. As described earlier in this embodiment the user preferences are obtained via the user device 25 as shown at 510. The user device 25 executing an app associated with accessing the lock 35 at a second building system 30 operates as a credential as shown at line 520. Using a credential to access a lock 35 by a user device 25 is well known in the art. The credential could be of the form of a digital certificate that specifies access rights that are verifiable as authentic and authorized by the lock 35. The credential can be transferred over a network 38 to the lock. The network 38 could be a point-point connection utilizing, for example, NFC or Bluetooth. Or, the network 38 could be a LAN connection as described above or other internet based communications network. This access of the lock 35 includes the request for access and communication, and the credential may also then be authenticated by the second building system 30 specifically associated with the lock 35. In addition, the user preferences and thermostat settings from the home system 20 are transmitted to the second building system 30, in this instance to the lock 35 as shown at line 530. The lock 35 at 540 and 550 coordinates communication to the controller 34, likewise at 560, controller 34 communicates with the lock 35 under selected conditions. As depicted at 560 the controller 34 connects with the lock 34 and acquires the user preferences from building system 20. Finally, at 570, the controller 34 e.g., a room thermostat applies the user preferences received from the first building system 20 and the users preferences from the first building system 20 are implemented in the second building system 30. It will be appreciated that while the process steps and connections are numbered and described in a given order, such description is provided for illustration only, and no particular steps and/or a particular order is required.

Figure 6:
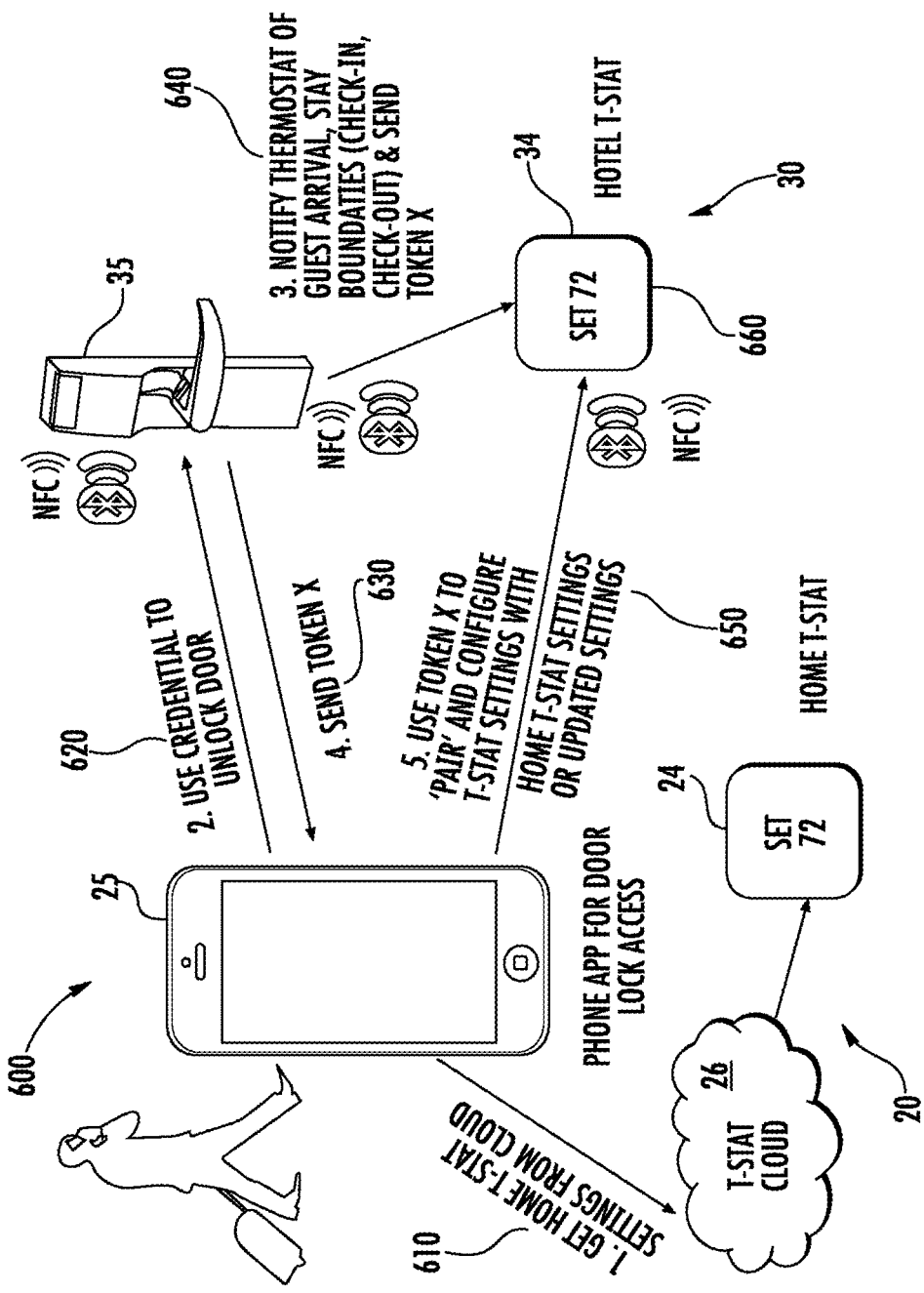
FIG. 6 depicts a simplified diagrammatic view of the system and interfaces for implementing the methodology of utilizing user preferences between two building systems in accordance with another embodiment.

Turning now to FIG. 6 as well for further example of an embodiment. FIG. 6 depicts a simplified diagrammatic view of an example system and interfaces for implementing the methodology 600 of utilizing user preferences between two building systems in accordance with an embodiment. In this embodiment, the controller 34 of the second building system 30 e.g., a thermostat in a hospitality application is configured via a lock 35 for access control and the user device 25. As described earlier in this embodiment the user preferences are obtained via the user device 25 as shown at 610. The user device 25 executing an app associated with accessing the lock 35 at a second building system 30 operates as a credential as shown at line 620. This access includes the request for access and communication and the presentation of the credential is then authenticated by the second building system 30 specifically associated with the lock 35. The lock 35 provides the authentication and provides a token back to the user device 25 to facilitate authenticated communications with one or more components of the second building system 30 as depicted by 630. It should be appreciated that the token may include access control limitation and constraints that may be associated with the lock 35. For example, in a hospitality application, the permissions and authentication may be limited to the duration of a guest's stay, or other constraints associated with the hospitality application. In this example, the token may be of a form that is verifiable by the hotel thermostat 34. For example, the token may be a digital certificate with information about the guest stay and a digital signature that can verify the token as authentic. The token may be additionally encrypted. The form of encryption may be AES or other well known encryption format to those skilled in the art. Moreover, the lock 35 at 640 optionally coordinates communication to the controller 34, and informs the controller 34 of an access request, authentication token and information regarding the credentialed user. In one embodiment, step 640 is eliminated and the token is of a form that is information bearing and can be verified by the thermostat 34. In another embodiment, step 640 is included and the token is of the form of a random number where the hotel thermostat would match the token received in step 640 with the token received in step 650. Further, the token may be used to encrypt or authenticate the request 650. As depicted at 650 the user device 25 connects with the controller 34 and communicates the token and user preferences and thermostat settings associated with the first building system 20, e.g., a home system. Finally, at 660, the controller 34 e.g., a room thermostat receives and applies the user preferences received from the first building system 20 implementing the users preferences from the first building system 20 in the second building system 30.

Figure 7:
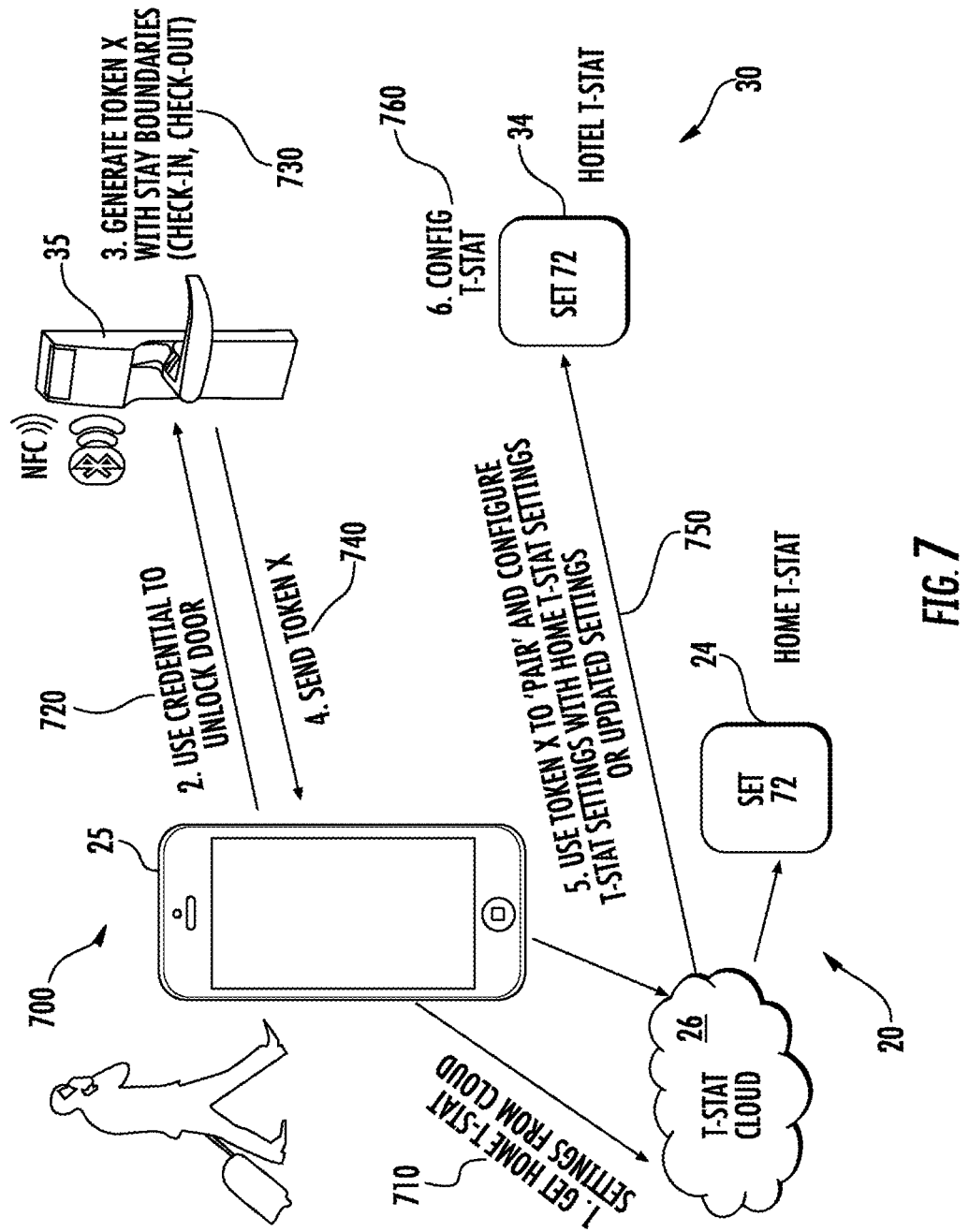
FIG. 7 depicts a simplified diagrammatic view of the system and interfaces for implementing the methodology of utilizing user preferences between two building systems in accordance with yet another embodiment.

Turning now to FIG. 7 as well for further example of an embodiment. FIG. 7 depicts a simplified diagrammatic view of an example system and interfaces for implementing the methodology 700 of utilizing user preferences between two building systems in accordance with an embodiment. In this embodiment, like the methodology 600, the controller 34 of the second building system 30 e.g., a thermostat in a hospitality application is configured with the user preferences associated with a controller 24 of the first building system 20. As described earlier in this embodiment the user preferences are obtained via the user device 25 as shown at 710. The user device 25 executes an app associated with accessing a component of the second building system 30. For example, in an embodiment, the user device via an app executing on the user device 25 accesses the lock 35 associated with the second building system 30. In an embodiment the user device 25 operating as a credential requests access to a component of the second building system 30 as shown at line 720. This access includes the request for access and communication and the presentation of the credential is then authenticated by the second building system 30 specifically associated with the lock 35 of the second building system 30. The lock 35 provides the authentication and generates a token to the user device 25 to facilitate authenticated communications with one or more components of the second building system 30 as depicted by 730. It should be appreciated that the token may include access control limitation and the system controller 34 e.g. a password and that like for access to the controller 34, and constraints that may be associated with the second building system 30, and in some embodiments the lock 35. The token may also be in the form of a digital certificate that has a verifiable signature. For example, in a hospitality application, the permissions and authentication may be limited to the duration of a guest's stay, or other constraints associated with the hospitality application. Moreover, the lock associated with the building system 30 at 740, coordinates communication from the first building system 20 to the controller 34 of the second building system 30, by providing the token and may include additional information regarding the credentialed user to the user device 25. The user device 25 communicates with other components in the first building system including the cloud computing environment 26 associated with the first building system 20. As depicted at 750 the server of the cloud computing environment 26 associated with the first building system 20 connects with the controller 34 and communicates the token, any connection information, and user preferences and thermostat settings associated with the first building system 20, e.g., a home system. In this example, the token would include information for directly connecting and authenticating to the controller 34, for example an IP address, host name, or other internet address resolvable reference for locating the device and a password for authenticating. In another embodiment, the cloud computing environment 26 would communicate with environment 36 and then environment 36 would communicate with controller 34. In this example, controller 34 has been preconfigured with a trust relationship (e.g. at installation of controller 34) with environment 36 and the token would include connecting and authenticating information for the cloud 26 to communicate with environment 36. Finally, at 760, the controller 34 e.g., a room thermostat receives and applies the user preferences received from the first building system 20 implementing the users preferences from the first building system 20 in the second building system 30.

Figure 8:
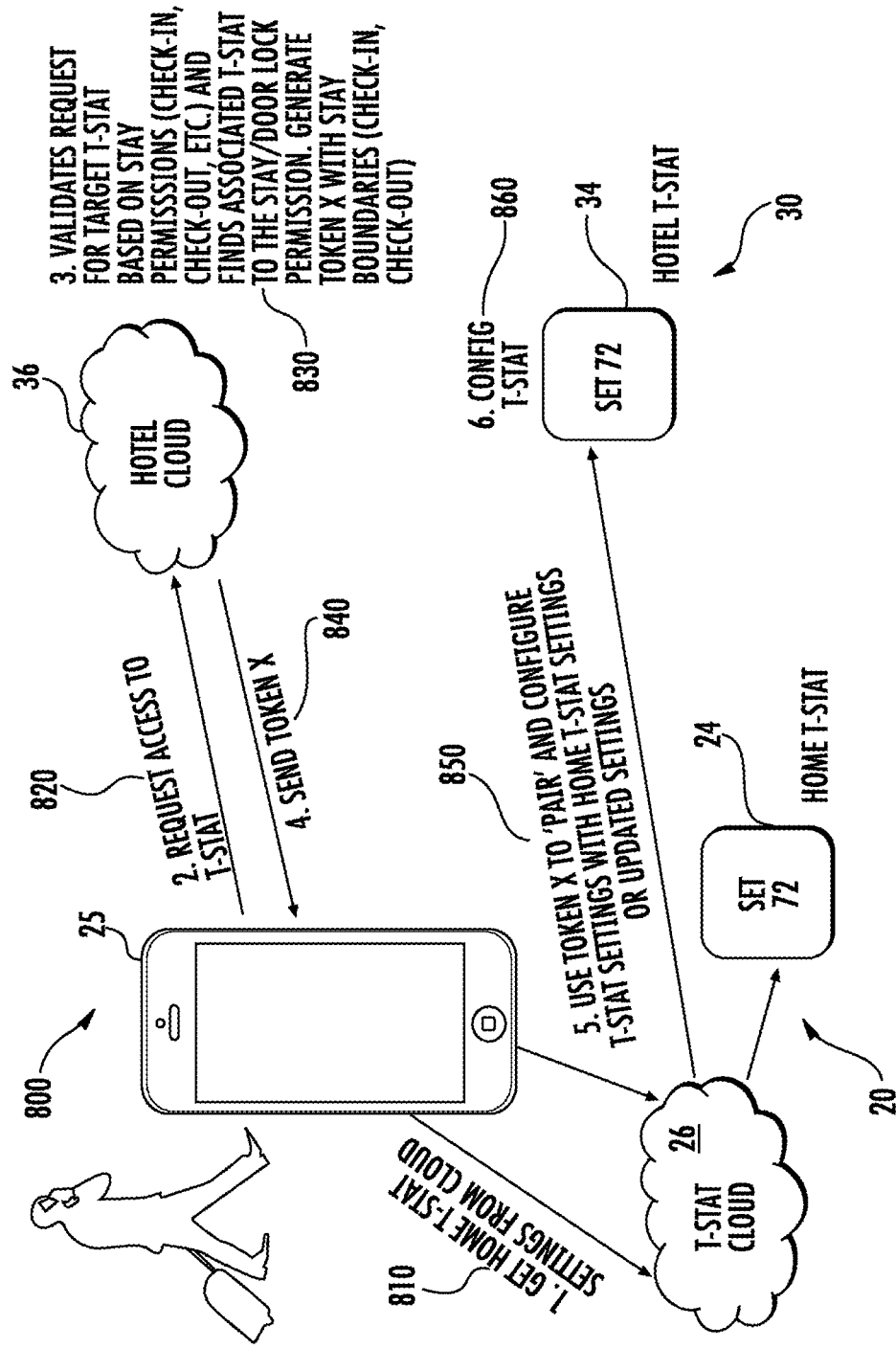
FIG. 8 depicts a simplified diagrammatic view of the system and interfaces for implementing the methodology of utilizing user preferences between two building systems in accordance with an embodiment.

Turning now to FIG. 8 as well for further example of an embodiment. FIG. 8 depicts a simplified diagrammatic view of an example system and interfaces for implementing the methodology 800 of utilizing user preferences between two building systems in accordance with an embodiment. In this embodiment, like the methodology 700, the controller 34 of the second building system 30 e.g., a thermostat in a hospitality application is configured with the user preferences associated with a controller 24 of the first building system 20. As described earlier in this embodiment the user preferences are obtained via the user device 25 as shown at 810. The user device 25 executing an app associated with accessing a component of the second building system 30. For example, in an embodiment, the user device via an app executing on the user device 25 accesses a server or cloud computing environment 36 associated with the second building system 30. In an embodiment the user device 25 operating as a credential requests access to a component of the second building system 30 as shown at line 820. This access includes the request for access and communication and the presentation of the credential is then authenticated by the second building system 30, specifically associated with the cloud computing environment 36 of the second building system 30. The cloud computing environment 36 may authenticate the user device 25 in any number of methods known to those skilled in the art. For example, the user device 25 may run an app that has a trust relationship with the cloud environment 26 that can communicate with a second app running on the same user device 25 where the second app has a trust relationship with the cloud environment 36. In this example, the first app may be a home thermostat app. Further in this example, the second app may be a hotel loyalty app. Using app to app communication, the first app may send the request to access the controller 34 to the second app. Authentication in this case is due to operation within a trusted environment on the same user device 25. In an alternate example, the user of the user device 25 may authorize a single app with separate credentials (i.e. user id and password) for each of the cloud environments 26 and 36 separately so that the same app can communicate to both in turn using the respective credential for authentication. In any case, the cloud computing environment 36 provides the authentication and generates a token to the user device 25 to facilitate authenticated communications with one or more components of the second building system 30 as depicted by 830 in a similar fashion as done in 730 in the previous example. It should be appreciated that the token may include access control limitation and the system controller 34 e.g. a password and that like for access to the controller 34, and constraints that may be associated with the second building system 30, and in some embodiments, the lock (not shown in FIG. 8). For example, in a hospitality application, the permissions and authentication may be limited to the duration of a guest's stay, or other constraints associated with the hospitality application. Moreover, the cloud computing environment 36 associated with the building system 30 at 840 coordinates communication from the first building system 20 to the controller 34 of the second building system 30 by providing the token and may include additional information regarding the credentialed user to the user device 25. The user device 25 communicates with other components in the first building system including the cloud computing environment 26 associated with the first building system 20. As depicted at 850 the server of the cloud computing environment 26 associated with the first building system 20 connects with the controller 34 and communicates the token, any connection information, and user preferences and thermostat settings associated with the first building system 20, e.g., a home system. The environment 26 may utilize information in the token to connect to and authenticate with the hotel thermostat controller 36. For example, the token may include an IP address, host name, or other internet address resolvable reference and a password for locating and authenticating to the controller 36. Finally, at 860, the controller 34 e.g., a room thermostat receives and applies the user preferences received from the first building system 20 implementing the users preferences from the first building system 20 in the second building system 30.

Figure 9:
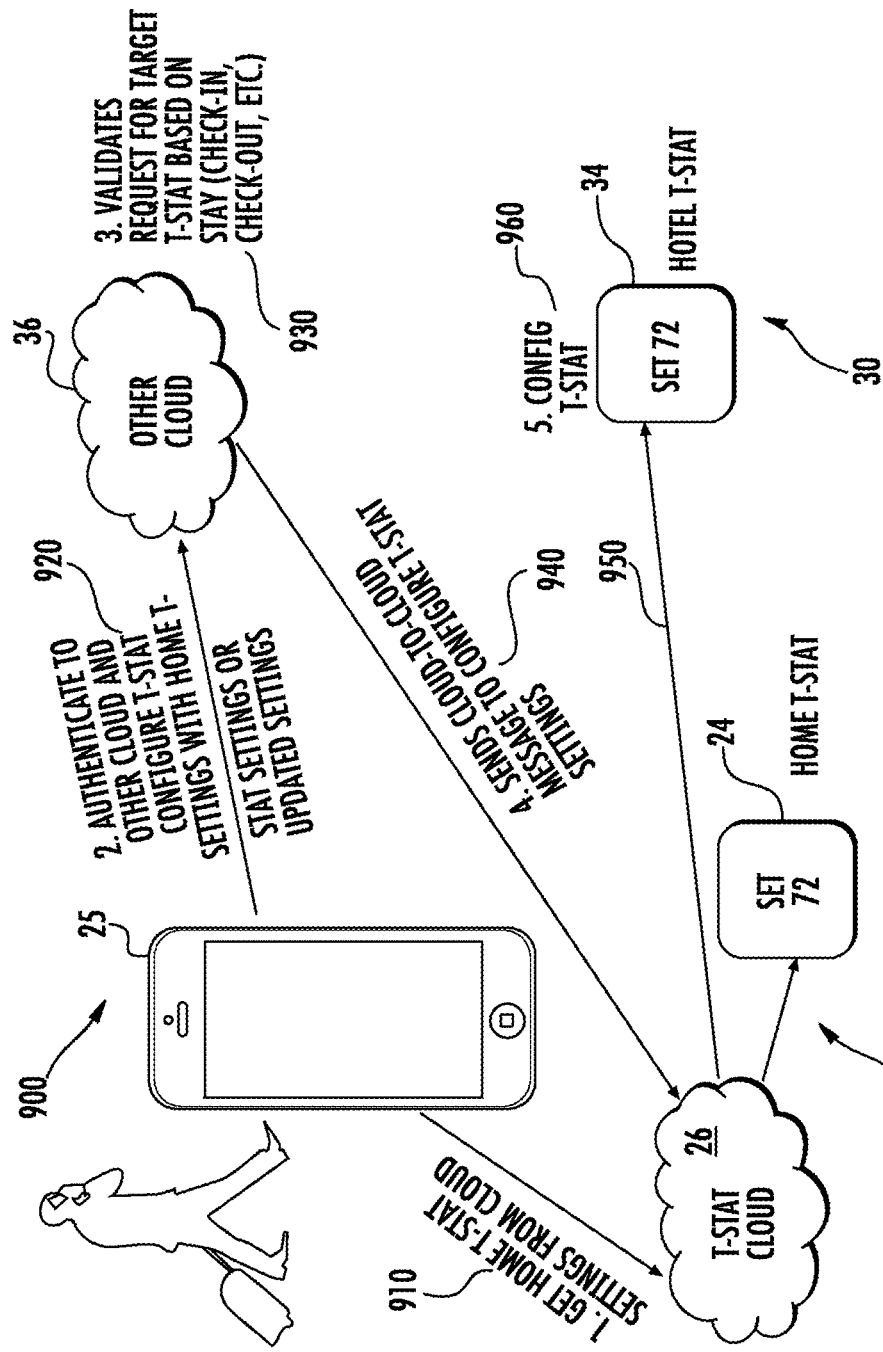
FIG. 9 depicts a simplified diagrammatic view of the system and interfaces for implementing the methodology of utilizing user preferences between two building systems in accordance with an embodiment.

Turning now to FIG. 9 as well for further example of an embodiment. FIG. 9 depicts a simplified diagrammatic view of an example system and interfaces for implementing the methodology 900 of utilizing user preferences between two building systems in accordance with an embodiment. In this embodiment, like the methodology 800, the controller 34 of the second building system 30 e.g., a thermostat in a hospitality application is configured with the user preferences associated with a controller 24 of the first building system 20. As described earlier in this embodiment the user preferences are obtained via the user device 25 as shown at 910. The user device 25 executing an app associated with accessing a component of the second building system 30. For example, in an embodiment, the user device via an app executing on the user device 25 accesses a server or cloud computing environment 36 associated with the second building system 30. In an embodiment the user device 25 operating as a credential, requests access to a component of the second building system 30 as shown at line 920. In this embodiment, the access request may include the user preferences and settings associated with the first building system 20 as well as access information associated with communications to the cloud computing environment 26 of the first building system 20. This access includes the request for access and communication and the presentation of the credential is then authenticated by the second building system 30 specifically associated with the cloud computing environment 36 of the second building system 30. The cloud computing environment 36 provides the authentication and generates a token or other authorization to the cloud computing environment 26 to facilitate authenticated communications with one or more components of the second building system 30 as depicted by 930. It should be appreciated that the token may include access control limitation and the system controller 34 e.g. a password and that like for access to the controller 34, and constraints that may be associated with the second building system 30, and in some embodiments, the lock (not shown in FIG. 9). For example, in a hospitality application, the permissions and authentication may be limited to the duration of a guest's stay, or other constraints associated with the hospitality application. Moreover, the cloud computing environment 36 associated with the building system 30 at 940 coordinates communication from the cloud computing environment 26 associated with the first building system 20 to the controller 34 of the second building system 30, by providing the token and may include additional information regarding the credentialed user. As depicted at 950 the server of the cloud computing environment 26 associated with the first building system 20 using the authorization and information provided by the cloud computing environment 36, connects with the controller 34 and communicates the token (e.g. in a similar way as 850 and 750), any connection information, and user preferences and thermostat settings associated with the first building system 20, e.g., a home system. Finally, at 960, the controller 34 e.g., a room thermostat receives and applies the user preferences received from the first building system 20 implementing the users preferences from the first building system 20 in the second building system 30. While steps 750, 850 and 950 depict the cloud computing environment 26 communicating with the controller 34, other variations are possible to the embodiments depicted in FIGS. 7, 8, and 9. For example, in FIG. 8 or 9, the request in step 820 and 920 may include the preferences obtain in steps 810 or 910 and the cloud service 36 may directly send the settings to the controller 34 using a pre-established trust relationship between cloud environment 36 and controller 34.

Figure 10:
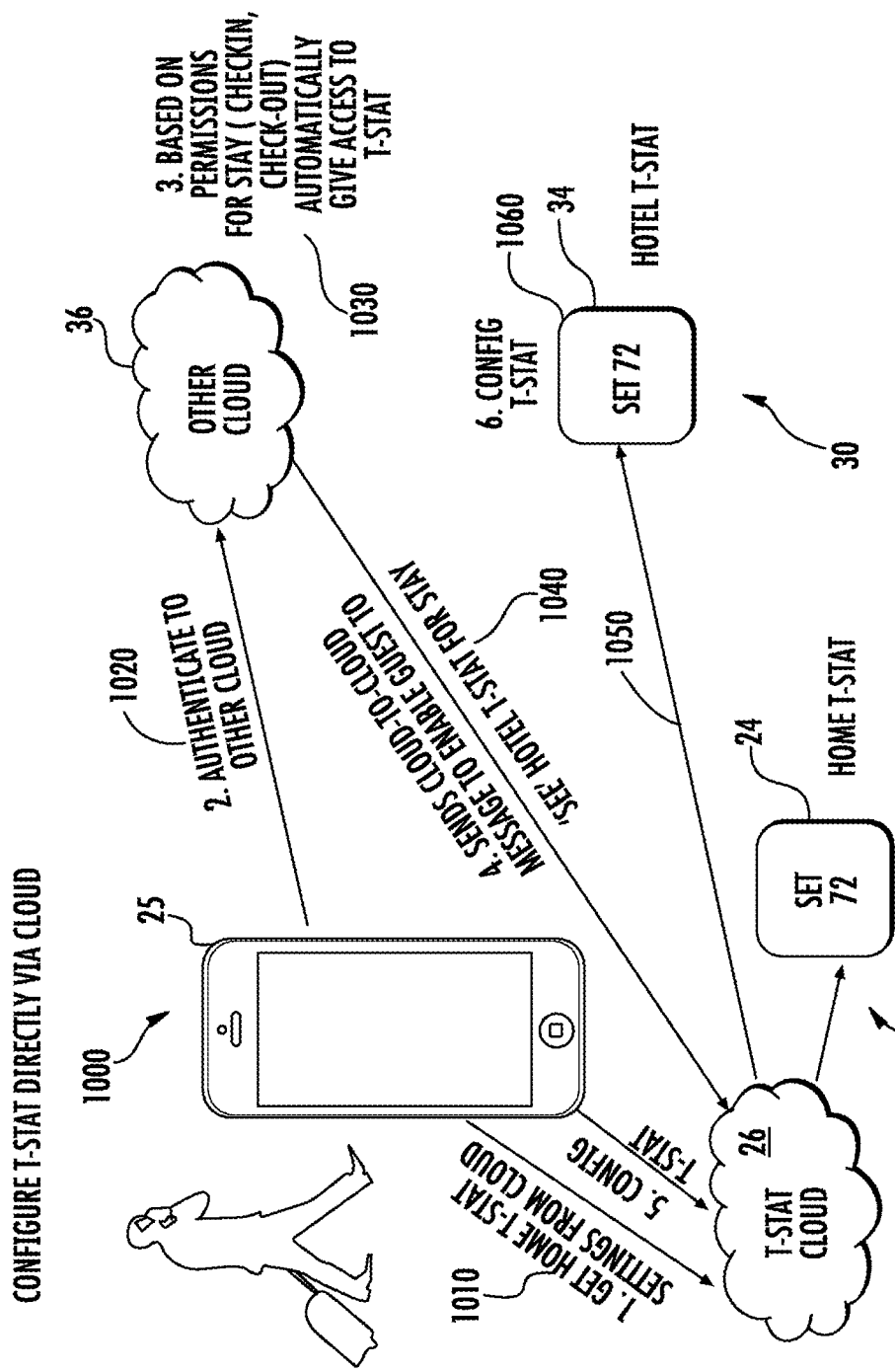
FIG. 10 depicts a simplified diagrammatic view of the system and interfaces for implementing the methodology of utilizing user preferences between two building systems in accordance with another embodiment.

Turning now to FIG. 10 as well for further example of an embodiment. FIG. 10 depicts a simplified diagrammatic view of an example system and interfaces for implementing the methodology 1000 of utilizing user preferences between two building systems in accordance with an embodiment. In this embodiment, like the methodology 900, the controller 34 of the second building system 30 e.g., a thermostat in a hospitality application is configured with the user preferences associated with a controller 24 of the first building system 20. As described earlier in this embodiment the user preferences are obtained via the user device 25 as shown at 1010 by retrieving from a cloud environment 26 or from in-app storage from previous entry by the user of the user device 25 or previous retrieval at some other time from cloud environment 26. The user device 25 executing an app associated with accessing a component of the second building system 30. For example, in an embodiment, the user device 25 via an app executing on the user device 25 accesses a server or cloud computing environment 36 associated with the second building system 30. In an embodiment the user device 25 operating as a credential, requests access to a component of the second building system 30 as shown at line 1020. In this embodiment, the access request may include only the request for access to controller 34 so that the user preferences and settings associated with the first building system 20 may be eventually applied to the controller 34 through the method 1000. This access includes the request for access and communication and the presentation of the credential is then authenticated by the second building system 30 specifically associated with the cloud computing environment 36 of the second building system 30. The cloud computing environment 36 provides the authentication and generates a token or other authorization to the cloud computing environment 26 to facilitate authenticated communications with one or more components of the second building system 30 as depicted by 1030. It should be appreciated that the token may include access control limitation and the system controller 34 e.g. a password and that like for access to the controller 34, and constraints that may be associated with the second building system 30, and in some embodiments, the lock (not shown in FIG. 10). For example, in a hospitality application, the permissions and authentication may be limited to the duration of a guest's stay, or other constraints associated with the hospitality application. Moreover, the cloud computing environment 36 associated with the building system 30 at 1040 coordinates communication from the cloud computing environment 26 associated with the first building system 20 to the controller 34 of the second building system 30, by providing the token and may include additional information regarding the credentialed user. Differently than the previous embodiment 900, the preferences and settings are not shared with cloud environment 36 but are sent directly from the cloud environment 26 as depicted at 1050 where the server of the cloud computing environment 26 associated with the first building system 20 using the authorization and information provided by the cloud computing environment 36, connects with the controller 34 and communicates the token, any connection information, and user preferences and thermostat settings associated with the first building system 20, e.g., a home system. The cloud environment 26 authenticates to the thermostat using the token information in a similar was as described in previous embodiments. Finally, at 1060, the controller 34 e.g., a room thermostat receives and applies the user preferences received from the first building system 20 implementing the users preferences from the first building system 20 in the second building system 30.

The technical effects and benefits of embodiments relate to a method and system for applying user preferences from a first building system 20 to a second or remote building system 30. In one instance the first building system may be a user's home, and the second building system may be a hotel room and/or some space in the hospitality industry. For example, a user owns a selected enabled Wi-Fi® thermostat for their home and visits a hotel room also outfitted with a similarly enabled Wi-Fi thermostat. In addition, the user has a smart device, e.g., mobile phone, has an app operating for controlling the home Wi-Fi® thermostat and an app and an app associated with the hotel access. For example an app associated with verifying the user and enabling access to the hospitality space. In operation, as part of the user attempting to gain entry to a secured space in the hotel, the mobile device is authenticated by a hotel credentialing app and/or cloud environment. In addition, such enablement also includes and enabling thermostat control in the hotel space. The enablement may typically be for a selected duration such as from check-in to check-out. Hotel room thermostat control is facilitated using either the home thermostat app (adds new thermostat) or through the hotel app. Connectivity is either through cloud or peer-to-peer. As soon as the hotel app senses the door lock, it can trigger the thermostat in the hotel room to set to the user preferred temperature for the mode depending on time of the day. When the app senses that it is no longer in the room, a smart setback reverts to previous settings. Alternatively, the hotel app queries occupant whether to upload home thermostat settings to hotel room, or control independently.

The terminology used herein is for the purpose of describing particular embodiments only and is not intended to be limiting of scope and breadth of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the described embodiments in the form disclosed. Many modifications and variations will be apparent to those of ordinary skill in the art without departing from the scope and spirit of the claims. The embodiments have been chosen and described in order to best explain the principles of the inventive concept and the practical application, and to enable others of ordinary skill in the art to understand the scope and breadth of the claims and the various embodiments with various modifications as are suited to the particular use contemplated.

What is claimed is:

1. A method of applying a user preference from a user device in a first space to a user controllable device in a second space comprising:
   acquiring a user preference associated with a first building system;
   authorizing communication with at least one user controllable device associated with a second building system;
   permitting control of a selected controllable device associated with the second building system based on the authorizing; and
   applying the user preferences associated with the first building system to the selected controllable device associated with the second building system;
   wherein the authorizing includes transmitting a request to the second building system, the request including presenting a credential for authentication;
   wherein the authorizing further includes a control device associated with the second building system authenticating the credential;
   wherein the second building system is an access control system and the control device is a lock, the lock communicating the user preference to the at least one user controllable device.

2. The method of claim 1, wherein the acquiring includes communicating to at least one of a cloud computing environment, the user device, and a control device associated with the first building system.

3. The method of claim 1, wherein the user preferences include at least one of a user setting, a schedule, and building system operational parameters.

4. The method of claim 1 wherein the credential includes at least one of an identification of the user, an identification of a user device, an identification of the control device associated with the first building system, a biometric, and a password.

5. The method of claim 1 wherein the request is at least one of a request for access to a space in the second building system and a request for authentication for communication to the second building system.

6. The method of claim 1, wherein the authorizing includes the user device communication to at least one of a cloud computing environment and a control device associated with the second building system.

7. The method of claim 1, wherein the permitting control of a selected controllable device associated with the second building system includes communicating information associated with the authentication to the selected controllable device of the second building system.

8. The method of claim 7, wherein the communicating information associated with the authentication includes at least one of a cloud computing environment and a control device associated with the second building system connecting to and communicating to the selected controllable device.

9. The method of claim 7, wherein the information associated with the authentication includes permissions associated with the permitting, the permissions including at least one of a duration associated with the permitting control, limitations on controllable features of the control of the selected controllable device, and operational parameters of the second building system to be controlled.

10. The method of claim 1, wherein the permitting control of a selected controllable device associated with the second building system includes communicating information associated with the authentication to the first building system.

11. The method of claim 10, wherein the communicating information associated with the authentication includes at least one of a cloud computing environment and a control device associated with the second building system connecting to and communicating to at least one of the user device, and a cloud computing environment associated with the first building system.

12. The method of claim 10, wherein the information associated with the authentication includes permissions associated with the permitting control, the permissions including at least one of a duration associated with the permitting control, limitations on controllable features of the control of the selected controllable device, operational parameters of the second building system to be controlled.

13. The method of claim 1, wherein the applying the user preferences associated with the first building system to the selected controllable device associated with the second building system includes communicating the user preferences to the selected controllable device, the selected controllable device implementing the user preferences based on permissions established as part of the permitting.

14. The method of claim 13, wherein the applying includes at least one of a cloud computing environment associated with the second building system, a control device associated with the second building system, a cloud computing environment associated with the first building system, a control device associated with the first building system, and the user device communicating the user preferences to the selected controllable device.

15. The method of claim 1, wherein the at least one user controllable device is a thermostat.

16. A system for applying a user preference associated with a first building system in a first building space to a user controllable device in a second building system in a second building space comprising:
   a user device in operable communication with a first building system and a second building system, the first building system including a user preference associated with the operation thereof, at least one of the first building system and the user device executing a method to transmit a request for access to the second building system requesting access to the second building space;
   wherein the at least one of the first building system and the user device receives an authorization for communication with at least one selectable controllable device associated with a second building system from the second building system and the second building system permits control of the selected controllable device associated with the second building system; and
   wherein the user preferences associated with the first building system are communicated to and applied by the selected controllable device associated with the second building system;
   wherein the authorizing includes transmitting a request to the second building system, the request including presenting a credential for authentication;
   wherein the authorizing further includes a control device associated with the second building system authenticating the credential;
   wherein the second building system is an access control system and the control device is a lock, the lock communicating the user preference to the at least one user controllable device.

17. A system for applying a user preference associated with a first building system in a first building space to a user controllable device in a second building system in a second building space comprising:
   means for acquiring a user preference associated with a first building system;
   means for authorizing communication with at least one user controllable device associated with a second building system;
   means for permitting control of a selected controllable device associated with the second building system based on the authorizing; and
   means for applying the user preferences associated with the first building system to the selected controllable device associated with the second building system;
   wherein the authorizing includes transmitting a request to the second building system, the request including presenting a credential for authentication;
   wherein the authorizing further includes a control device associated with the second building system authenticating the credential;
   wherein the second building system is an access control system and the control device is a lock, the lock communicating the user preference to the at least one user controllable device.

* * * * *